Patented June 19, 1928.

1,674,474

UNITED STATES PATENT OFFICE.

WALTER A. KUHNERT, OF LOS ANGELES, CALIFORNIA.

PROCESS FOR RECOVERY OF SODIUM BICARBONATE FROM BRINES.

No Drawing.   Application filed March 29, 1927.  Serial No. 179,401.

This invention relates to a process for treatment of brines containing relatively high percentages of sodium carbonate, for the purpose of recovering soda principally or wholly in the form of sodium bicarbonate.

The principal object of the invention is to provide for the recovery of a maximum portion of the soda content of such brines, principally or wholly as bicarbonate, in a single carbonating operation, and to produce such sodium bicarbonate with a minimum consumption of carbon dioxide and in such condition that it may be easily separated from the brine and freed from impurities.

My invention is applicable particularly to the brines now existing in Owens Lake, California, but may be also applied generally to other complex brines containing such high percentages of soda as to make the recovery thereof by ordinary methods practically impossible, as hereinafter explained, and particularly to brines containing materially in excess of 10% normal sodium carbonate.

The commercial production of sodium bicarbonate from natural brines by direct carbonation has heretofore been accomplished exclusively by the carbonation of such brines as contained, among other salts, an amount of sodium carbonate less than, or but little in excess of, 10% of the weight of the brine. The reason for this limitation in the concentration of the normal carbonate in the brines heretofore treated may be seen from a consideration of the chemical and physical results that are obtained in the carbonation procedure now employed in the art.

It is at present customary to effect the recovery of sodium bicarbonate from natural brines of the general type under discussion, by subjecting such brines to carbonation with kiln-gas containing from 33% to 38% of carbon dioxide by volume, and to supply such gas at such a rate and under such conditions as to cause absorption of about 30 pounds or more of carbon dioxide per hour per 1000 gallons of brine. This procedure causes a chemical reaction to ensue between the carbon dioxide, water and normal sodium carbonate of the brine, which results in the formation of sodium bicarbonate; and owing to the comparatively low solubility of this salt, here still further depressed by the other salts in the brine, the bulk of the sodium bicarbonate thus formed is precipitated from solution during the period of carbonation.

The chemical reaction involved in the carbonation, however, is exothermic, and the presence of other salts such as borax in the brine prohibits the successful application of ordinary cooling methods during the course of carbonation, because of excessive cooling of the brine in contact with the cooling means and consequent precipitation of such salts to form a coating thereon. It follows therefore that the precipitation of the sodium bicarbonate must occur at whatever temperautre the mother liquor may have at the moment of precipitation. Under these conditions, and in the presence of a high concentration of sodium carbonate, the temperature steadily rises as carbonation proceeds, and the texture or size of the sodium bicarbonate crystals obtained is subject to great variation, the size of the crystals becoming progressively smaller and more difficult to recover and to purify as the temperature of the mother liquor increases during the carbonation. A further objection to the above described mode of procedure is that above a certain temperature the rate of absorption of carbon dioxide in the brine decreases rapidly so that a poor efficiency of utilization of carbon dioxide results.

In these circumstances it will be seen that a limit in the concentration of normal sodium carbonate is required in brines from which commercially pure sodium bicarbonate is to be recovered by the carbonation method now in use. Actual operating results, guided by the necessity of maintaining standard purities, have shown the current carbonating procedure to be unsuited for treatment of natural carbonate brines of the Owens Lake, California, type, when such brines contain normal sodium carbonate materially in excess of 10% by weight. In confirmation of this, it is a matter of record that following the summer of 1921, when the residual brine of Owens Lake became decidedly richer in normal carbonate concentration than 10% by weight, the established soda producers at the source completely abandoned carbonation of the natural brine and substituted artificial solutions obtained by leaching natural precipitates of sodium carbonates and other salts, with fresh water.

This method of controlling the concentration of normal sodium carbonate in solutions intended for carbonation is still being followed there, while the true residual lake brine, now regularly containing from 14% to nearly 16% of normal sodium carbonate throughout the major portion of the year, is left untouched.

I have found, however, that these objections can be overcome, to a large extent at least, by conducting the first part of the carbonating operation under such conditions, particularly as regards rate of supply or absorption of carbon dioxide, as to prevent an excessive rise in temperature and at the same time cause precipitation of the soda in the form of sodium sesquicarbonate rather than bicarbonate, until the soda concentration is reduced to a certain point such that more rapid carbonation would not cause too rapid a reaction and a consequent objectionable rise in temperature. The carbonation is continued beyond this point, however, without removal from the carbonating tower of the sodium sesquicarbonate thus precipitated and while such sesquicarbonate is still maintained in suspension in or admixture with the brine. During this latter stage of the carbonating operation, the rate of carbonation may be increased if desired so as to minimize the time required for precipitation of any desired further quantity of the soda, whether as sodium bicarbonate directly or as sodium sesquicarbonate, and for conversion of the precipitated sodium sesquicarbonate partly or wholly to the form of bicarbonate. The sodium sesquicarbonate formed under the conditions contemplated is of a coarsely crystalline nature, while the sodium bicarbonate formed during the latter portion of the operation, either by direct precipitation or by further carbonation of the precipitated sesquicarbonate, is also of a coarsely crystalline nature in view of the low temperature and low concentration of sodium carbonate prevailing during such latter portion of the operation. It will be understood that it is permissible to carbonate more rapidly during this latter stage because the concentration of sodium carbonate has by that time been so reduced that the carbonating reaction occurs more slowly and does not cause the excessive rise in temperature above mentioned. While an increased rate of carbonation may therefore be employed during the latter part of the operation, and while such increased rate is generally to be preferred from the point of view of maximum soda recovery in a given time, it is not necessary that the process be so carried out. If desired, the low rate of supply of carbon dioxide which is necessitated during the first part of the operation may be maintained throughout, the only difference being that in that case a longer time is required to complete the carbonating operation to the point of the desired soda recovery.

I will describe my invention as applied to the treatment of a brine such as is found in Owens Lake, California, one example of such brine, after solar concentration, being of approximately the following composition:

|  | Per cent. |
|---|---|
| $Na_2CO_3$ | 14.60 |
| $Na_2B_4O_7$ | 4.36 |
| $NaCl$ | 8.27 |
| $KCl$ | 5.66 |
| $Na_2SO_4$ | 3.19 |
| Other salts and water | 63.92 |
| Total | 100.00 | it being understood that the composition of this brine will change considerably from time to time owing to variations in temperature, evaporation and other conditions.

The brine is, if necessary, first brought by solar evaporation or otherwise to a condition of substantial saturation with respect to sodium carbonate at the temperature of the brine, which in the summer may be in the neighborhood of 100° F. The saturated brine having, for example, the composition represented in the above table is then pumped into any suitable receptacle or tank, and is subjected to the action of carbon dioxide obtained in any suitable manner, for example, from a lime kiln or from a receptacle containing liquid carbon dioxide under pressure. The gases from the lime kiln containing more or less carbon dioxide are pumped by means of any suitable blower, fan, or compressor into contact with the brine. In order to provide effective contact, the gas containing carbon dioxide may be forced into the body of brine under pressure so as to cause the gas to bubble up through the brine and thereby bring the carbon dioxide into intimate contact with the brine. The carbon dioxide is absorbed or reacts with the soda in its passage through the brine while the remaining inert gas serves to very thoroughly agitate the brine thus facilitating the reaction. This operation may, for example, be conducted in carbonating towers of the type ordinarily used for carbonation of such brines, said towers being provided for example with perforated diaphragms or other baffle means at intervals throughout the height thereof so as to assist in the distribution of the gas and provide the highest degree of agitation of the brine and the most intimate contact between carbon dioxide and brine.

Heretofore in the separation of soda as sodium bicarbonate from brine of this character it has been usual to supply the carbon dioxide bearing gas at a concentration of about 33% or more of carbon dioxide by volume and to supply such gas at a relatively high rate, for example at such a rate that for a single batch of brine containing, say 18,000 gallons, about 5,000 pounds of carbon dioxide were absorbed in 9 hours. This corresponds to an absorption of 30.9 pounds of carbon dioxide per hour per 1000 gallons of brine. In the operation, as carried out in this manner on brines of this character containing substantially the concentration of sodium carbonate above mentioned, the reaction has gone so rapidly that it has been found to be impracticable by any of the well-known cooling means available to prevent an excessive rise in temperature of the brine, say to a temperature above 45° C., and the precipitation of soda therefore occurred in a very finely crystalline or mushy condition, so that it was extremely difficult to separate the crystals from the solution by centrifuging, filtering or settling, and to completely wash the crystals. I have found, however, that by maintaining a materially lower rate of absorption of carbon dioxide in the brine than heretofore, which may be accomplished either by suitably reducing the concentration of carbon dioxide in the carbonating gas or by reducing the rate of supply of the carbon dioxide bearing gas to the brine or by reducing both the carbon dioxide content and the rate of supply of the gas, and by properly controlling the temperature, a portion of the soda can be precipitated largely or wholly in the form of sodium sesquicarbonate and in a comparatively coarse crystalline condition. The necessary control of the temperature is provided automatically, to a large extent at least, by the reduction in the rate of carbonation which slows down the reaction and hence prevents the excessive rise of temperature above mentioned.

The precipitation of sodium sesquicarbonate from brines in the manner above described has already been described and claimed in my United States Patent No. 1,618,834, February 22, 1927, for process for recovery of sodium sesquicarbonate from brines. According to the process described in said application, however, the sodium sesquicarbonate thus precipitated is separated principally as such from the brine, while the process of my present invention comprises subjecting the mixture of brine or mother liquor and sodium sesquicarbonate obtained by the procedure above described, to a further carbonation, in which the rate of carbonation may be increased if desired, but which may be otherwise conducted substantially in the manner above described, so as to precipitate a further small quantity of soda from the brine in the form of sodium sesquicarbonate or sodium bicarbonate and also convert part at least of the precipitated sesquicarbonate to the form of bicarbonate, so as to obtain in the end a precipitate which consists principally or substantially wholly of sodium bicarbonate.

The process therefore consists in general, in first carbonating with a relatively low rate of absorption of carbon dioxide by the brine, and without permitting the temperature to rise above a certain point, so as to precipitate sodium sesquicarbonate in a coarsely crystalline condition, until the concentration of the soda in solution has been reduced to say 8 to 10%, or in general to such an extent that the rate of carbonation may be increased without causing an excessive rise in temperature, and then carbonating either at the same rate or at an increased rate, as is then permissible to precipitate the remainder of the soda content of the brine or any desired proportion thereof such as may be found most economical in practice, either in the form of sesquicarbonate or bicarbonate, and at the same time convert the sesquicarbonate, which has been previously precipitated but maintained in admixture with the brine, partly or wholly to the form of bicarbonate, and then separating the sodium bicarbonate so formed from the brine, together with any unconverted sesquicarbonate. By carrying out the operation in this manner the temperature of the brine is at no time permitted to rise sufficiently to cause the formation of the fine mushy precipitate heretofore obtained. The sodium bicarbonate formed in the brine by my process, whether by direct precipitation during the latter portion thereof or by recarbonation of the previously precipitated sesquicarbonate, is of a coarsely crystalline nature and may be easily separated from the brine by filtration, centrifuging or otherwise, and may also be readily washed free from impurities.

I have obtained good results by carrying out the carbonating operation in the following manner. The carbon dioxide bearing gas coming from the lime kiln or other supply means is, if necessary, during the first stage of the carbonating operation, diluted with air or with other inert gas so as to present a concentration of about 23 to 28% of carbon dioxide, and this gas is brought into contact with the solution in the manner above described at a temperature preferably about 37° C. (or say from 30° C. to 45° C.) and at such a rate and in such manner as to cause absorption of about 1700 pounds of carbon dioxide in an 18,000 gallon batch of brine in about 12 hours. This represents an absorption of only 7.9 pounds of carbon dioxide per hour per 1000 gallons of brine. It will be seen that under these conditions the rate of absorption of carbon dioxide is materially slower than under the conditions heretofore practiced, so that the tendency to heating of the brine by the exothermic reaction is much less, and the precipitate formed by such carbonation is largely or wholly in the form of sodium sesquicarbonate and is of a coarsely crystalline nature. Carbonation under the conditions and for the period above mentioned has served to reduce the sodium carbonate content of a brine from about 14% to about 8%. In general, I prefer to supply the carbonating gas at such a rate, with such a concentration of carbon dioxide, and under such conditions of distribution, agitation, and temperature, as to cause absorption of carbon dioxide by the brine at only about ¼ to ½ the rate of absorption formerly prevailing, or say from 7 to 15 pounds of carbon dioxide per hour per 1000 gallons of brine, and in any event, the rate of absorption should not exceed 20 pounds of carbon dioxide per hour per 1000 gallons of brine in order to effect precipitation of the soda in the desired form.

When the sodium carbonate content of the brine has been reduced to say 8% or sufficiently so that more rapid carbonation is practicable as above provided, the rate of carbonation may, if desired, be increased to substantially that heretofore employed for such a batch of brine, that is to say, to a rate of absorption of about 5,000 pounds of carbon dioxide in 9 hours. With this rapid rate of carbonation and in the presence of the reduced concentration of sodium carbonate, further precipitation occurs largely or wholly in the form of sodium bicarbonate, but as the rate of reaction is reduced by the relatively low concentration of sodium carbonate no excessive rise in temperature occurs and the sodium bicarbonate is precipitated in the form of relatively coarse crystals. If desired, however, the rate of supply of carbon dioxide may be maintained the same during the latter portion of the operation as during the first portion, in which case the time of carbonation will be materially increased. This stage of the carbonation may be continued until the desired removal of soda has been effected, say until the sodium carbonate concentration is reduced to about 2 to 4%. It will be understood, of course, that it is possible to remove substantially all of the sodium carbonate in this manner, but as the sodium carbonate concentration is reduced the rate of reaction decreases and a poor efficiency of utilization of the carbon dioxide results, so that the extra time and the large consumption of carbon dioxide required to remove the last portion of the sodium carbonate, say the last 2 or 3% thereof, is not compensated for by the additional material recovered. I therefore find it advisable in practice to stop the carbonating operation when the sodium carbonate content has been reduced to about 2 to 4%, but I do not wish to be understood as limited in this regard.

Simultaneously with the precipitation of sodium bicarbonate from the solution during this latter carbonating stage, a portion of the carbon dioxide reacts upon the previously precipitated sodium sesquicarbonate, which is still retained in suspension in the brine or in admixture therewith in the lower part of the carbonating tower, to convert the same largely or wholly to the form of bicarbonate, and the bicarbonate so produced is also in the form of relatively coarse crystals.

The bicarbonate, in suspension in the liquor, is then removed from the carbonating apparatus and the mixture passed through suitable separating means, such as filtering or centrifuging apparatus, or both, for separation of the sodium bicarbonate therefrom together with any unaltered sodium sesquicarbonate or other precipitated material contained therein. In view of the coarsely crystalline nature of the precipitate, as compared with the fine, mushy material obtained if it is attempted to precipitate sodium bicarbonate directly by carbonation at the normal rate of a brine containing a high proportion of sodium carbonate such separating operation may be conducted rapidly and such rapid separation is of advantage not only in permitting maximum production with a minimum amount of separating equipment, but also because it permits the sodium bicarbonate to be completely removed from the brine before permitting appreciable precipitation of other constituents of the brine, such as colloidal silicates or aluminates, which tend to precipitate from such a brine after carbonation, but which require a considerable period of time for precipitation. The sodium bicarbonate is therefore recovered substantially free from such colloidal impurities and may easily be washed, either in the filter or in the centrifuge, to give a product consisting of sodium bicarbonate of a high degree of purity with or without a relatively small proportion of sodium sesquicarbonate. This washing or purification is also facilitated by the relatively coarsely crystalline nature of the product.

The brine or mother liquor, after separation of the sodium bicarbonate therefrom, may if desired, be treated in any suitable manner for the recovery of other constituents therefrom. For example, it may be cooled to 20° C. or below, and allowed to stand for two or three days at this temperature, with intermittent agitation or circulation, to cause precipitation of a substantial proportion of its borax content, which may then be separated therefrom by decantation, filtration or otherwise.

I claim:

1. The process for production of sodium bicarbonate from complex brines containing sodium carbonate, which comprises carbonating such a brine by contact with carbon dioxide bearing gas, while maintaining the rate of supply of carbon dioxide to the brine sufficiently low to maintain the temperature below 45° C. and cause precipitation to occur principally in the form of coarsely crystalline sodium sesquicarbonate, until the concentration of sodium carbonate in the brine has been materially reduced, and then, while still maintaining in admixture with the brine the material so precipitated, continuing to carbonate the brine further with a suitable rate of supply of carbon dioxide bearing gas to precipitate a further quantity of the soda partly at least in the form of sodium bicarbonate and at the same time convert a part at least of the precipitated sodium sesquicarbonate to sodium bicarbonate and ultimately produce a precipitate consisting principally of sodium bicarbonate, and then separating such precipitate from the brine.

2. A process as set forth in claim 1 in which the rate of supply of carbon dioxide to the brine is increased during said further carbonating operation.

3. A process for recovery of soda from complex brines containing materially in excess of 10% normal sodium carbonate, which comprises passing carbon dioxide bearing gas in contact with such brine, while maintaining the rate of supply of carbon dioxide to the brine sufficiently low to so retard the carbonating reaction as to prevent the brine from being heated by the heat of such reaction to a temperature above 45° C. and to also cause precipitate to occur principally in the form of coarsely crystalline sodium sesquicarbonate, until the sodium carbonate content of the brine is reduced below 10%, and then, while still maintaining in admixture with the brine the material so precipitated, continuing to pass carbon dioxide bearing gas in contact with the brine to cause further precipitation therefrom of a further quantity of material consisting in part at least of sodium bicarbonate and at the same time convert part at least of the precipitated sesquicarbonate to bicarbonate and ultimately produce a precipitate consisting principally of sodium bicarbonate, and then separating such precipitate from the brine.

4. A process of recovering soda from complex brines containing the same, which consists in carbonating the brine by bringing it into contact with carbon dioxide bearing gas having a concentration of carbon dioxide of less than 33% in such manner as to cause precipitation of a portion of the soda content of the brine in the form of sodium sesquicarbonate during such carbonating operation, then, while maintaining in admixture with the brine the material so precipitated, continuing such carbonating operation with carbon dioxide bearing gas of any suitable carbon dioxide concentration to precipitate a further quantity of soda from such brine and to also convert part at least of the precipitated sodium sesquicarbonate to the form of sodium bicarbonate and ultimately form a solid product consisting principally of sodium bicarbonate, and then separating such solid product from the brine.

5. The process for production of soda from complex brines containing materially in excess of 10% normal sodium carbonate, which comprises carbonating such a brine by contact with carbon dioxide bearing gas in such manner as to cause absorption of carbon dioxide by the brine at a rate of less than 20 pounds of carbon dioxide per hour per thousand gallons of brine and hence cause precipitation to occur principally in the form of coarsely crystalline sodium sesquicarbonate, until the sodium carbonate content of the brine is reduced below 10% then continuing such carbonating operation at a suitable rate of absorption of carbon dioxide, while maintaining in admixture with the brine the material so precipitated, to precipitate a further quantity of soda from such brine and to also convert part at least of the precipitated sodium sesquicarbonate to the form of sodium bicarbonate and ultimately form a solid product consisting principally of sodium bicarbonate, and then separating such solid product from the brine.

6. A process as set forth in claim 5 and comprising in addition the following steps of cooling the brine and allowing the same to stand, after separation of said solid product therefrom, so as to cause precipitation of borax from the brine, and then separating such precipitated borax therefrom.

7. The process for production of soda from complex brines containing materially in excess of 10% normal sodium carbonate, which comprises carbonating such a brine by contact with carbon dioxide bearing gas in such manner as to cause absorption of carbon dioxide by the brine at a rate of about 8 pounds of carbon dioxide per hour per 1000 gallons of brine and hence cause precipitation to occur principally in the form of coarsely crystalline sodium sesquicarbonate, until the sodium carbonate content of the brine is reduced below 10%, then continuing such carbonating operation at a suitable rate of absorption of carbon dioxide, while maintaining in admixture with the brine the material so precipitated, to precipitate a further quantity of soda from such brine and to also convert part at least of the precipitated sodium sesquicarbonate to the form of sodium bicarbonate and ultimately form a solid product consisting principally of sodium bicarbonate, and then separating such solid product from the brine.

8. A process of recovering soda from complex brines containing the same, which consists in carbonating the brine by bringing it into contact with carbon dioxide bearing gas having a concentration of carbon dioxide of less than 33% so as to cause precipitation of a portion of the soda content of the brine in the form of sodium sesquicarbonate during such carbonating operation, then continuing such carbonating operation with carbon dioxide bearing gas, while maintaining in admixture with the brine the material precipitated during the first named carbonating operation, to convert the major portion of the precipitated material to the form of sodium bicarbonate and ultimately form a solid product consisting principally of sodium bicarbonate, and then separating such solid product from the brine.

9. The process for production of soda from complex brines containing materially in excess of 10% normal sodium carbonate, which comprises carbonating such brine by contact with carbon dioxide bearing gas in such manner as to cause absorption of carbon dioxide by the brine at a rate of less then twenty pounds of carbon dioxide per hour per thousand gallons of brine and hence cause precipitation to occur principally in the form of coarsely crystalline sodium sesquicarbonate, until the sodium carbonate content of the brine is reduced below 10%, then, while still maintaining in admixture with the brine the material so precipitated, continuing to carbonate the brine by contact with carbon dioxide bearing gas to convert the major portion of the precipitated sodium sesquicarbonate to the form of sodium bicarbonate and ultimately form a solid product consisting principally of sodium bicarbonate, and then separating such solid product from the brine.

In testimony whereof I have hereunto subscribed my name this 22nd day of March, 1927.

WALTER A. KUHNERT.